June 1, 1971   JEAN-PIERRE VERSPIEREN   3,581,349
RING CLAMP
Filed March 2, 1970   2 Sheets-Sheet 2
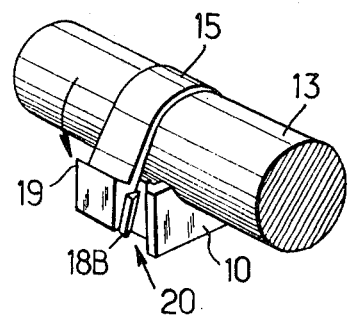
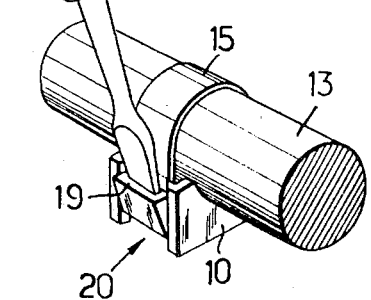
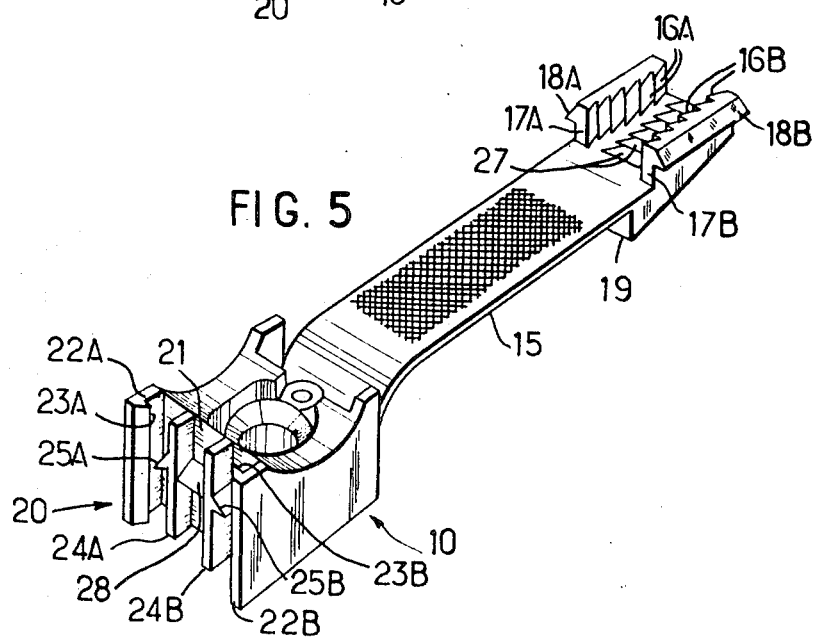
INVENTOR
JEAN-PIERRE VERSPIEREN
By Young & Thompson
ATTYS.

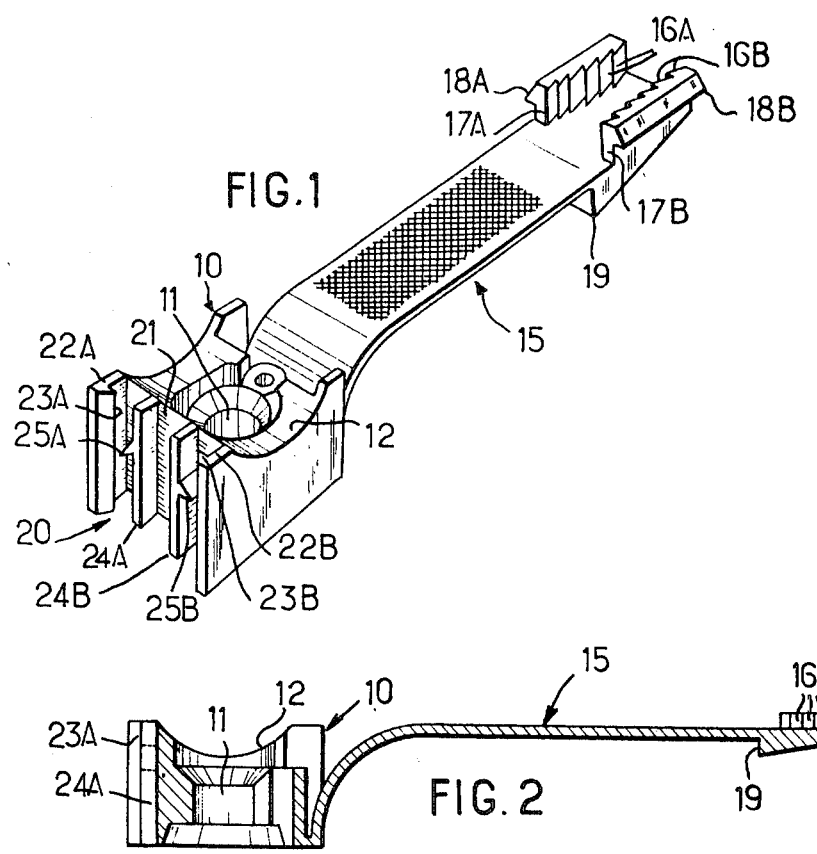

United States Patent Office 3,581,349
Patented June 1, 1971

3,581,349
RING CLAMP
Jean-Pierre Verspieren, Limoges, France, assignor to
Legrand S.A., Limoges, France
Filed Mar. 2, 1970, Ser. No. 15,436
Claims priority, application France, Mar. 7, 1969,
6,368
Int. Cl. B65d 63/00
U.S. Cl. 24—16PB                                6 Claims

ABSTRACT OF THE DISCLOSURE

A ring clamp of one-piece construction is formed of plastics material and includes a flexible strap adapted to be secured into position in a fastening head. The fastening head is disposed at one end of the strap and a pair of flanges each having a series of upstanding ratchet teeth and a longitudinal securing tooth. The fastening head includes a pair of ratchets each of which is adapted for engagement with one of the series of ratchet teeth of the strap and a pair of securing teeth adapted for engagement with the securing teeth on the fastening head. In order to secure a cylindrical member in the ring clamp, the corresponding ratchet teeth are simultaneously brought into engagement as at least one of the pair of securing teeth are resiliently deflected and brought into cooperation with the other pair of securing teeth. The engagement of the ratchet teeth allows the further tightening of the ring clamp but prevents further loosening of the ring clamp. The ring clamp can be opened by resiliently deflecting the securing teeth out of engagement with one another.

---

The present invention relates to ring clamps of the type which are formed of a synthetic plastics material and are of a unitary construction including a flexible strap and a fastening head in which the strap is secured thereby forming a ring.

Accordingly, the flexible strap is provided with at least one series of transverse ratchet teeth and the associated fastening head is provided with at least one transverse ratchet tooth adapted for engagement with any of the series of ratchet teeth.

In order to fasten the strap to the fastening head, all that is necessary is that one or more of the ratchet teeth be brought into engagement with the ratchet tooth of the fastening head.

Further, in order to assure that the strap is secured, the securing teeth are brought into engagement with other securing teeth.

The securing is assured by forming in the fastening head or in a portion of the flexible strap integral with the fastening head, a groove in which the free end of the strap is engaged. The teeth of the flexible strap are brought into engagement with the teeth of the fastening head.

Owing to the asymmetrical profile of the ratchet teeth, the passage allows the relative sliding of the flexible strap in the fastening head in a single direction of displacement corresponding to decreasing the diameter of the ring formed by the flexible strap, but opposes the sliding of the strap in the opposite direction, however, by a movement of the strap transverse to the said displacement the teeth of the flexible strap are taken out of engagement with the teeth of the fastening head.

Ring clamps have been and continue to be very useful for connecting any two members, for example, for fixing an electrical conduit or tubing to a support. Such ring clamps present however a substantial disadvantage, i.e. once the two members are fixed to one another by such a ring clamp, it is very difficult or even impossible to take the members apart and if the members are taken apart such an action most often results in rendering the ring clamp unusable.

An object of the present invention is to provide a ring clamp which overcomes the abovementioned disadvantages.

A further object of the present ring clamp is the provision of means for tightening and adjusting the tension.

An aspect of the present invention consists in a ring clamp comprising a longitudinal flexible strap and a fastening head disposed at an end of the flexible strap and formed integral therewith, a pair of flanges extending from one side and at one end of the said strap, a series of ratchet teeth and a longitudinal securing tooth disposed on each of the flanges, a pair of ratchet teeth and a pair of longitudinal securing teeth mounted on one face of the fasteing head, each of the said pair of ratchet teeth adapted for engagement with one of the said series of ratchet teeth and each of the longitudinal securing teeth on the flexible strap adapted to be resiliently deflected into engagement with the longitudinal securing teeth on the fastening head for maintaining the ratchet teeth in engagement with one another.

As in prior art devices, the transverse ratchet teeth act longitudinally, i.e. in the direction of the extension and parallel to the plane of the flexible strap. In the present invention the longitudinal securing teeth according to the invention act transversely, i.e. perpendicular to the plane of the flexible strap.

Accordingly, the securing teeth are resiliently snapped or deflected into position when the ring clamp is in its closed position and effectively maintain the flexible strap in engagement with the ratchet teeth of the fastening head.

If it is desired to open the ring clamp, i.e. disengage and then disconnect the flexible strap from the fastening head, it is again merely necessary to resiliently snap or deflect the flexible strap out of engagement with the securing teeth of the fastening head.

This resilient deflection or snapping is easily effected; further, it leaves the ring clamp in tact and ready for subsequent use.

Further features and advantages of the present invention will be brought out in the description which follows of two embodiments according to the invention, given merely by way of example with reference to the accompanying schematic drawing wherein:

FIG. 1 is a perspective view of a ring clamp according to the invention;

FIG. 2 is a longitudinal section of the ring clamp shown in FIG. 1;

FIGS. 3 and 4 are schematic perspective views showing the fixing of the ring clamp to a tube of two successive steps in this operation;

FIG. 5 is a view analogous to that of FIG. 1 of an alternative embodiment.

With regard to the embodiment shown in FIGS. 1 to 7, a ring clamp according to the invention comprises a base portion which is adapted to be fixed to a support; accordingly, the base portion 10 is hollow and includes an axial passage 11 for receiving a securing means, for example, a screw.

The upper face 12 of the base portion is preferably concave in order to better cooperate with a cylindrical member 13 to be fixed such as a tube, pipe or bar (see FIGS. 3 and 4).

A flexible strap 15 is integrally formed with the base portion 10 and includes transverse ratchet teeth 16A and 16B formed along the opposed faces of the flanges 17A and 17B and disposed at the free end of the flexible strap remote from the base portion 10.

Longitudinal securing teeth 18A and 18B are carried along the outer faces of the flanges 17A and 17B. The strap 15 further carries on its other face a transverse supporting tooth whose function will be described hereinafter.

Finally, in conformity with this embodiment a fastening head 20 is formed on the base portion 10. The fastening head 20 comprises a wall 21 formed by one of the faces of the said base portion, two lateral flanges 22A and 22B carrying longitudinal securing teeth 23A and 23B and two longitudinal strips 24A and 24B extending along the middle portion of the wall 21 spaced from one another. The strips 24A and 24B carry the ratchet tooth 25A and 25B respectively which extend towards the corresponding flanges 22A and 22B.

The combination of each of the strips 24A and 24B of the fastening head 20 with its corresponding flange 22A and 22B forms a space for receiving the corresponding flanges 17A and 17B of the flexible strap 15.

The operation of the ring clamp will now be described with reference to FIGS. 3 and 4.

The base portion 10 is brought into position relative to the member to be fixed as the flexible strap is turned over the member. A force is then exerted on the support shoulder 19, for example, by means of the tip of a screwdriver as shown in FIG. 4.

This operation is carried so that on one hand the securing teeth 18A and 18B of the flexible strap 15 are resiliently deflected and snapped into engagement, the corresponding teeth 23A and 23B of the fastening head 20 and one pair of ratchet teeth 16A and 16B of the strap 15 comes into engagement with one pair of the teeth 25A and 25B of the fastening head and on the other hand the flexible strap 15 is tightened to the desired amount about the member 13 by the irreversible sliding of the end of the strap 15 in the fastening head 20.

The removal of the member 13 can easily and quickly be accomplished by exerting a force between strap 15 and a fixed element, i.e. the member 13 or the base portion 10 in order to resiliently disengage the securing teeth 23A and 23B from the securing teeth 18A and 18B.

With regard to the alternative embodiment shown in FIG. 5, a supplementary plurality of transverse ratchet teeth 27 are carried by the strap 15 along the middle portion thereof between the flanges 17A and 17B in addition to the transverse ratchet teeth 16A and 16B already described in the other embodiment.

The teeth 27 are adapted to cooperate with a transverse ratchet tooth 28 carried on the wall 21 of the fastening head 20 between the longitudinal strips 24A and 24B disposed thereon.

So that it will be noted, it is always possible to further tighten the strap 15 around the member 13 by exerting a force on the tooth 19 even when the strap is already secured. The tightening can thus be irreversibly increased by one or more available teeth. This remark is obviously equally applicable to the embodiment of FIGS. 1 to 4.

The present invention is of course not limited to the embodiments shown and described herein but includes all modifications within the scope of the invention.

I claim:

1. A ring clamp comprising a longitudinal flexible strap and a fastening head disposed at an end of the flexible strap and formed integral therewith, a pair of flanges extending from one side and at one end of the said strap, a series of rachet teeth and a longitudinal securing tooth disposed on each of the flanges, a pair of ratchet teeth and a pair of longitudinal securing teeth mounted on one face of the fastening head, at least one of the pairs of securing teeth being resiliently deflectable, each of the said pair of ratchet teeth adapted for engagement with one of the said series of ratchet teeth and each of the longitudinal securing teeth on the flexible strap adapted to be resiliently deflected into engagement with the longitudinal securing teeth on the fastening head for maintaining the ratchet teeth in engagement with one another.

2. A ring clamp as claimed in claim 1, wherein each of the said series of ratchet teeth are disposed on the inner face of its respective flange and each of the said securing teeth are disposed on the outer face of its respective flange, and wherein each of the said pair of ratchet teeth are disposed on the said face of the fastening head between the said pair of longitudinal securing teeth.

3. A ring clamp as claimed in claim 2, wherein on the said face of the fastening head are disposed a pair of strips for supporting the said pair of ratchet teeth and a pair of flanges for supporting each of the said pair of longitudinal securing teeth, and wherein the strips extend substantially parallel to the said pair of longitudinal securing teeth and each of the said pair of ratchet teeth extends obliquely from its respective strip towards the adjacent flange.

4. A ring clamp as claimed in claim 3, wherein an additional series of ratchet teeth are disposed on the said side of the strap between the flanges, and an additional ratchet tooth is disposed between the strips on the said face of the fastening head whereby the additional series of ratchet teeth are adapted for engagement with the additional ratchet tooth during the engagement of the series of ratchet teeth with their respective one of the said pair of ratchet teeth.

5. A ring clamp as claimed in claim 1, wherein a transverse support shoulder is provided on the other side of the strap and provides means for bringing the ratchet and securing teeth of the strap in engagement with the ratchet and securing teeth of the fastening head.

6. A ring clamp as claimed in claim 1, further comprising a base portion including the fastening head and means for fixing the ring clamp to a support.

References Cited

UNITED STATES PATENTS

| | | | |
|---|---|---|---|
| 3,157,377 | 11/1964 | Orenick | 248—71 |
| 3,206,813 | 9/1965 | Schumm, | 24—16PB |
| 3,513,508 | 5/1970 | Modémé | 24—16PB |

DONALD A. GRIFFIN, Primary Examiner

U.S. CL. X.R.

248—74PB